United States Patent Office 2,782,112
Patented Feb. 19, 1957

2,782,112
HERBICIDE

Everett E. Gilbert, Flushing, Julian A. Otto, Long Island City, and Silvio A. Pellerano, Brooklyn, N. Y., assignors to Allied Chemical & Dye Corporation, New York, N. Y., a corporation of New York No Drawing. Application January 4, 1954, Serial No. 402,136

31 Claims. (Cl. 71—2.6)

This invention relates to herbicides and more particularly refers to new compounds and compositions and the use of such compounds and compositions as herbicides.

Weeds may be broadly defined as undesirable plant growth. In certain places, for example railroad tracks, any vegetation thereon is considered a weed and complete eradication of all plants desired. Perhaps even of greater magnitude and importance is selective control of weeds in agriculture, i. e. retardation of growth or extermination of weeds without injury to crops. Many chemicals have been suggested for weed destruction but have found relatively limited commercial application for various reasons. The cost of chemical materials for treating soil, which cost embraces both the price per pound and the quantity required, is obviously an important factor in commercial utilization of weed killers. Explosion and fire hazard, equipment corrosion, and toxicity to animal life are examples of other factors which must be weighed to determine the value of chemicals employed for weed control. The selectivity of a chemical must be considered not only with respect to the soil to which it is applied but also to the effect of a chemical on adjacent fields containing crops which may be sensitive to this chemical. Also, and very important, the chemical must be capable of formulation to permit convenient even distribution on the soil at a controlled rate because even minor variations in dosages have a marked effect on the plants.

An object of the present invention is to provide new compounds and compositions containing said compounds effective for use as herbicides.

Another object of the present invention is to provide an economical efficient method of controlling weeds by the application of new compounds and new compositions of matter.

A further object of the present invention is to provide selective control of weeds by the use of new compounds in an amount of the order of about 2 lbs. or less per acre of ground.

A still further object of this invention is to provide soil sterilization with larger amounts of the new compounds in an amount of the order in excess of 10 lbs. per acre of ground.

Another object of the present invention is to provide liquid herbicidal composition containing the new compound.

Other objects and advantages of the present invention will be apparent from the following description.

We have discovered that compounds conforming to the general formula

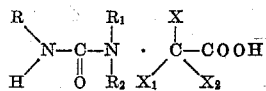

wherein R represents a cyclic group selected from the class consisting of the phenyl, alkyl-phenyl, aralkyl-phenyl, diphenyl, naphthyl, cyclohexyl and alkyl-cyclohexyl radicals, and their halogen substitution products; $R_1$ represents a group selected from the class consisting of hydrogen and an aliphatic hydrocarbon radical having no more than six carbon atoms; $R_2$ represents an aliphatic hydrocarbon radical having no more than six carbon atoms; X represents a halogen; and $X_1$ and $X_2$ represent a member of the group selected from the class consisting of hydrogen and halogen, have exceptional effectiveness as a herbicide. The preferred compounds are those conforming to the above formula wherein R represents an aryl group selected from the class consisting of phenyl and monochlorophenyl radicals; $R_1$ represents a group selected from the class consisting of hydrogen and an aliphatic hydrocarbon radical having no more than three carbon atoms; $R_2$ represents an aliphatic hydrocarbon radical having no more than three carbon atoms; X represents chlorine; and $X_1$ and $X_2$ represent a member of the group selected from the class consisting of hydrogen and chlorine.

Specific examples illustrating the compounds of the present invention are:

(1) 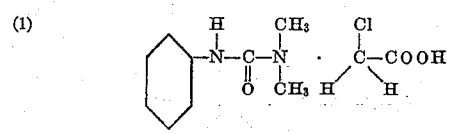

(2) 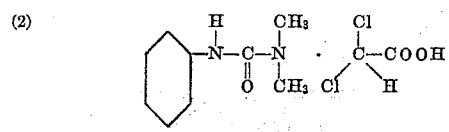

(3) 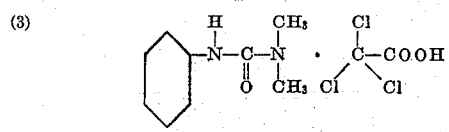

(4) 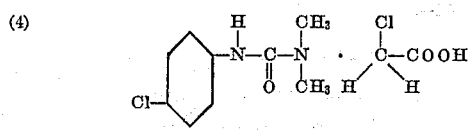

(5) 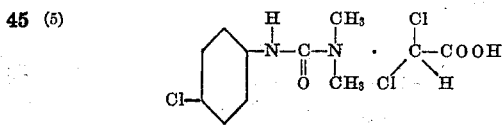

(6) 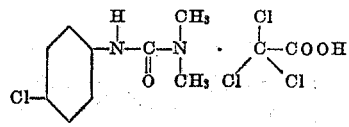

(7) 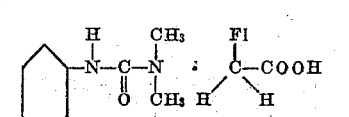

(8) 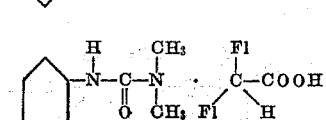

(9) 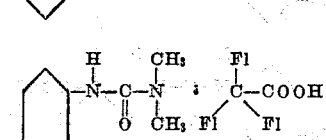

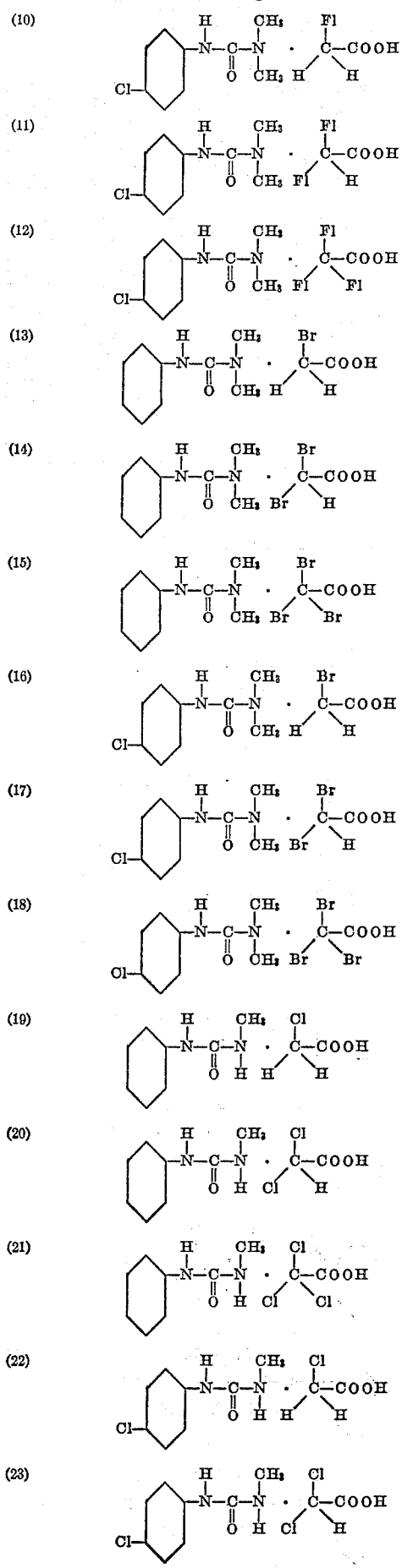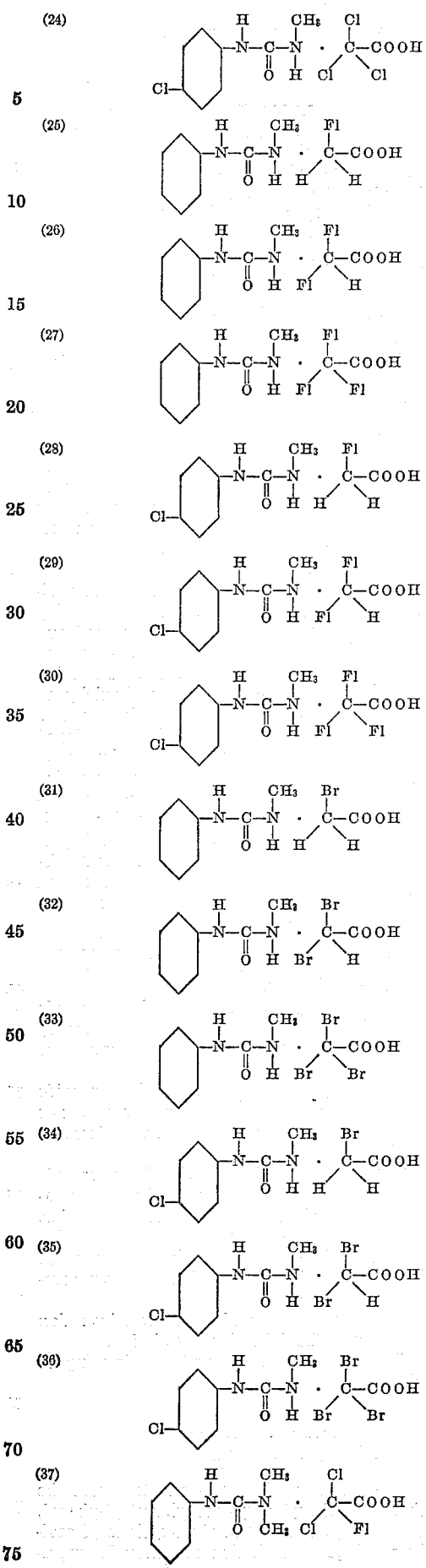

(38) 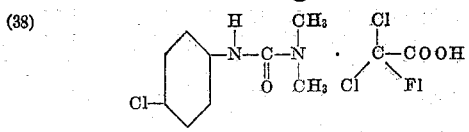

(39) 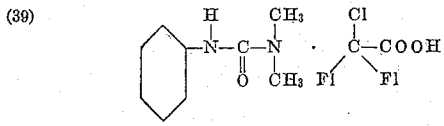

(40) 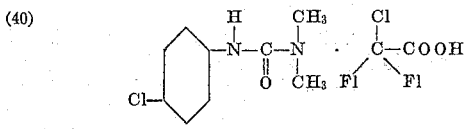

The compounds of the present invention may be prepared by reacting a diamide of the class having the general formula

wherein R represents an aryl group selected from the class consisting of the phenyl, alkyl-phenyl, aralkyl phenyl, diphenyl and naphthyl radicals and their halogen substitution products; $R_1$ represents a group selected from the class consisting of hydrogen and an aliphatic hydrocarbon radical having no more than six carbon atoms; $R_2$ represents an aliphatic hydrocarbon radical having no more than six carbon atoms with a halogenated aliphatic organic acid such as monochloroacetic, dichloroacetic, trichloroacetic, monofluoroacetic, difluoroacetic, trifluoroacetic, monobromoacetic, dibromoacetic, tribromoacetic, monofluorodichloroacetic, and difluoromonochloroacetic. The reaction may be readily accomplished by mixing the diamide and halogenated acid preferably in the presence of a liquid aromatic hydrocarbon solvent such as benzene, toluene or xylene in which the acid is soluble, at about room temperature. The reaction product may be separated from the reaction mixture by crystallization and more easily by adding a large excess of a paraffin hydrocarbon such as petroleum ether which causes the reaction product to separate out of solution from the xylene. The reaction product is a new compound formed by the reaction of one mol of the diamide with one mol of halogenated acid and, dependent upon the particular diamide and halogenated acetic acid employed, is a solid or liquid reaction product, its properties different from either the diamide or halogenated acid reactants. In the course of our investigation we have found that such closely related compounds as acetic acid and alpha monochloropropionic acid do not react with the diamide. For purposes of convenience the new reaction products will be termed "diamido-halo-acido" compounds.

One property which makes the diamido-halo-acido compounds particularly useful in the formulation and application as a herbicide is the high solubility of these compounds in aromatic hydrocarbons such as xylene, which is often used as a carrier or solvent for agricultural formulations. Compounds of the type 1-(phenyl)-3,3-dimethylurea and 1-(4-chlorophenyl)-3,3-dimethylurea have indicated excellent herbicidal properties. However, these compounds suffer from the serious objection of being only slightly soluble in most organic solvents and water. This renders these compounds difficult to formulate as liquid which fact has seriously impeded their application and use as practical agricultural chemicals. Solubility is especially low in aromatic hydrocarbons such as xylene which is often used as a carrier or solvent for agricultural purposes. Thus, 1-(phenyl)-3,3-dimethylurea is soluble in xylene at 30° C. to the extent of only about 0.5% while 1-(4-chlorophenyl)-3,3-dimethylurea is soluble to even a lesser extent. The diamido-halo-acido compounds are very soluble in aromatic solvents—xylene solutions can be prepared having a concentration of 25% or more diamido-halo-acido compound.

The urea type compounds such as chlorophenyldimethylurea may be prepared as concentrates by dissolving them in a limited number of expensive organic liquids. However, when such concentrate is diluted with an inexpensive liquid carrier medium to form a liquid formulation there is difficulty in preparing the mixture in evenly dispersed form, maintaining the chlorophenyldimethylurea in dispersed form, and applying the phenyldimethylurea at a uniform dosage to the soil. The problem of distributing uniform dosages of herbicide to the soil for agricultural purposes is particularly acute because low dosages are required and slight variations in dosages to the soil may destroy the crop or negative the effectiveness of the herbicide for weed killing or both. For example, in pre-emergence treatment the use of ½ lb. per acre herbicide may effectively control weeds whereas more than 1–2 lbs. herbicide may cause material damage to the crop. Based on practical experience the most effective method for applying consistently uniform dosages of herbicide to agricultural crops sensitive to such herbicides and requiring low dosages would be to apply a dilute true solution of the herbicide. Since the herbicidal ingredient employed in the solution for agricultural purposes, such as pre-emergence application, is a relatively small amount compared to the quantity of solvent—roughly 200 parts or more solvent are employed per part of herbicide—it is important that such solvent be low in cost and readily available to the farmer. A liquid hydrocarbon petroleum fraction, such as fuel oil, diesel oil, kerosene and naphtha, is an excellent material for use as a herbicidal solvent because it is readily available to the farmer, low in cost, non-corrosive, and has some herbicidal activity of its own. The herbicides, chlorophenyldimethylurea and phenyldimethylurea, have extremely low solubility in petroleum fractions and even concentrates, i. e., a solution of these ureas in an organic solvent, have such low solubility in petroleum fractions that dilute true solutions of these ureas cannot be formed of sufficient strength to be of any practical interest. The diamido-halo-acido compounds of the present invention have good solubility in xylene and other similar aromatic solvents and in the presence of excess acid such solutions blend easily with petroleum fractions thus forming an inexpensive liquid formulation which can be conveniently and uniformly applied as a pre-emergence herbicide in dilute concentrations of ½–2 lbs. diamido-halo-acido compounds per acre of soil.

The following examples illustrate preparation of the new diamido-halo-acido compounds of the present invention.

EXAMPLE 1

To 5 parts by weight trichloroacetic acid, a colorless solid having a melting point of 57.5° C., dissolved in 30 parts by weight xylene was added 5 parts by weight 1-(phenyl)-3,3-dimethylurea, a white solid melting at about 130° C. With stirring, a homogeneous colorless solution resulted. (Solubility of the phenyldimethylurea in xylene alone is about 0.5 gram per 100 grams xylene.) The mixture was drowned in 300 parts by weight petroleum ether. After stirring for a few minutes a white precipitate resulted. This was collected on a filter and washed with petroleum ether to yield 8.7 parts by weight snow white crystals which had a melting point of 65–68° C. The white crystals were analyzed and found to be the reaction product of phenyldimethylurea and trichloroacetic acid in a 1:1 mol ratio. X-ray spectrographic analysis of the white crystals showed them to have a different diffraction pattern from either of the individual reactants, namely trichloroacetic acid and phenyldimethylurea.

EXAMPLE 2

(a) To a solution of 10 parts by weight trichloroacetic acid in 30 parts by weight xylene was added 5 parts by weight 1-(phenyl)-3,3-dimethylurea (mol ratio of trichloroacetic acid-phenyldimethylurea of 2:1). A colorless solution resulting was treated as in Example 1 to yield 7.7 parts by weight of a white crystalline solid of melting point of 63–68° C. Except for a trace of occluded trichloroacetic acid the white crystalline solid is the same as was obtained in Example 1. The identity of the reaction product solids from Examples 1 and 2 was confirmed by identical X-ray spectrographic curves.

(b) Trichloroacetic acid (681 parts), 1-(phenyl)-3,3-dimethylurea (681 parts) and benzene (290 parts) were warmed to 45° C. with stirring to yield a clear solution. Hexane (1500 parts) was then added with cooling and agitation. Crystals separated over a period of about 1 hour. They were filtered and washed with cold hexane. A yield of 1322 parts (97% of theory) was obtained.

Example 2 (a) as compared to Example 1, illustrates that the reactants react in a one-to-one molar ratio even when the reaction mixture contains an excess of one reactant.

The reaction products of Examples 1 and 2 were separately further analyzed to determine their composition as follows: the white crystalline solid reaction product was dissociated into trichloroacetic acid and phenyldimethylurea, the trichloroacetic acid going into solution and most of the phenyldimethylurea remaining as a solid precipitate. By titrating the aqueous solution the solid reaction product was found to contain 49.8% trichloroacetic acid. Calculated for the trichloroacetic acid-phenyldimethylurea compound of 1:1 mol ratio, the percent trichloroacetic acid=49.9. The solid from the aqueous solution was identified as 1-(phenyl)-3,3-dimethylurea by its melting point. In addition, molecular weight determinations of the solid reaction product from Examples 1 and 2 were made by the cryoscopic procedure in benzene and the molecular weight of the solid compound was found to agree with the molecular weight of the compound resulting from the reaction of trichloroacetic acid and phenyldimethylurea in 1:1 mol ratio.

From the foregoing we have concluded that the formula of the white crystalline solid produced in Examples 1 and 2 corresponds to

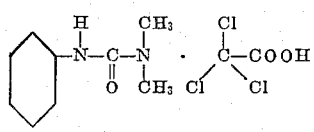

EXAMPLE 3

60 parts by weight of xylene and 6.5 parts by weight trichloroacetic acid, and 6.3 parts by weight of 1-(4-chlorophenyl)-3,3-dimethylurea, having a melting point of about 170° C., when mixed formed a homogeneous clear solution. (Solubility of chlorophenyldimethylurea is about 0.2 g./100 g. xylene.) The mixture was drowned in 400 parts by weight petroleum ether. A white solid precipitated immediately. Collected on a filter, washed with petroleum ether and air dried, the resultant solid constituted 10.3 parts by weight. The glistening snow white solid melted at 78–81° C. Percent trichloroacetic acid: Found=45.0. Calculated for trichloroacetic acid-chlorophenyldimethylurea compound (1:1 mol ratio)=45.1%. The formula of the reaction product is

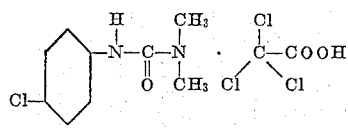

EXAMPLE 4

1-(phenyl)-3-methylurea was reacted with trichloroacetic acid in the presence of xylene forming a homogeneous colorless solution from which a solid was precipitated by drowning in an excess of petroleum ether. The separated solid melted at 58–60° C. Percent trichloroacetic acid: Found=51.4%. Calculated for trichloroacetic acid—1-(phenyl)-3-methylurea compound (1:1 mol ratio)=52.1%. The formula of the reaction product is

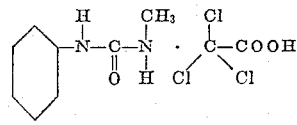

EXAMPLE 5

1-(4-chlorophenyl)-3,3-dimethylurea was reacted with dichloroacetic acid in the presence of xylene forming a homogeneous colorless solution from which a solid was precipitated by drowning in an excess of petroleum ether. The separted solid melted at 71–85° C. Percent dichloroacetic acid: Found: 39.5%. Calculated for dichloroacetic acid—1-(4-chlorophenyl)-3,3-dimethylurea (1:1 mol ratio)=39.4%. The formula of the reaction product is

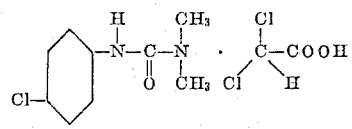

EXAMPLE 6

The following illustrates the striking difference in solubility of diamido-halo-acido compounds in liquid aromatic hydrocarbons as compared with the starting urea. Trifluoroacetic acid was reacted with 1-(phenyl)-3,3-dimethylurea by mixing in the proportion of (a) equal parts by weight of reactants; (b) 2 parts by weight of the trifluoroacetic acid with 1 part by weight of the phenyldimethylurea; and (c) 3 parts by weight of the trifluoroacetic acid with one part by weight of the phenyldimethylurea. The resultant products were liquid. 1-(phenyl)-3,3-dimethylurea alone is only slightly soluble in xylene. However, when the reaction mixture was mixed in the proportion of 2 and 3 parts of reaction mixture to one part of xylene the resulting mixture was a clear solution thereby showing complete miscibility with xylene. The formula of the reaction product is

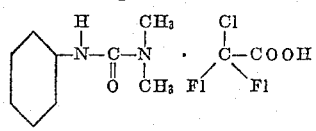

EXAMPLE 7

1 part by weight of 1-(phenyl)-3,3-dimethylurea was reacted with 1, 2, 3, 4, and 5 parts by weight of difluoromonochloroacetic acid and produced liquid reaction products. These liquid reaction products were found to be highly soluble in xylene to the extent of over 50% of the xylene solution. The formula of the reaction product is

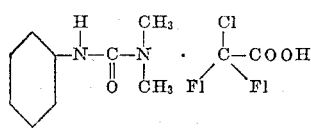

EXAMPLE 8

Example 7 was repeated using monofluorodichloroacetic acid instead of the difluoromonochloroacetic acid used in that example. The resultant liquid reaction products were found to be very soluble in xylene. The formula of the reaction product is

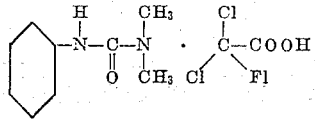

EXAMPLE 9

8.2 parts by weight of 1-(phenyl)-3,3-dimethylurea were added to 7.7 parts by weight monobromoacetic acid in 30 parts by weight of xylene. A homogeneous solution was formed. The solution was then drowned in 300 parts by weight petroleum ether. An oil layer separated. The petroleum ether was decanted and the oil layer washed with 3 portions of 125 parts by weight petroleum ether and then dried in a vacuum dessicator to remove solvent. The final oil constituted 13.5 parts by weight which is 85% of the theoretical yield. The formula of the reaction product is

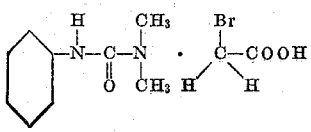

Because of the high potency of diamido-halo-acido compounds and for purposes of marketing and of application, it is usually desirable to admix the diamido-halo-acido compounds with other materials. These formulations may take four forms: wettable powder, dust, emulsifiable concentrate, and solution.

Wettable powder formulations comprise four ingredients: diamido-halo-acido compound, inert diluent, wetting agent and dispersing agent. The percentage of diamido-halo-acido compounds may range from 25 to 90%. The wetting and dispersing agents may each be ½ to 5% and the remainder is inert diluent. To obtain thorough mixing, the composition is blended in a conventional ribbon mixer. The powder thus obtained is then finally ground by milling in a conventional mill or pulverizer. A specific example of a wettable powder formulation is 80.8%.

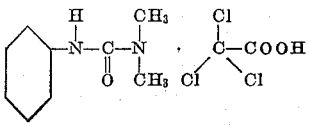

15.7% hydrated silicon dioxide (inert diluent) sold under the trade name "Hi Sil," 2.0% sulfonate wetting agent known in the trade as "Igepon AP 78," and 1.5% lignosulfonate dispersing agent bearing the brand name "Marasperse N."

Dust formulations comprise two ingredients: diamido-halo-acido compound and inert diluent. The percentage of toxicant will normally be 1–10%. Examples of inert diluents are pyrophyllite, known in commerce as "Pyrax ABB" and talc sold under the name of "EMTCO 23." Preparative procedure is the same as with wettable powders, i. e. ribbon mixing and milling as described above.

The third type of formulation—the emulsifiable concentrate—comprises a water-insoluble solvent, an emulsifying agent and diamido-halo-acido compound. Generally, it is desirable to have the formulation contain not more than 50% diamido-halo-acido compound, a small amount, about 2 to 10%, of emulsifying agent such as "BCX 70" or "Toximul 200," and the remainder water-insoluble solvent such as xylene or "Velsicol AR–50G." In preparing emulsifiable concentrates, it is usually preferred to employ some excess acid over that required to form the desired compound. This is illustrated by the following example:

EXAMPLE 10

A 25% by weight solution of

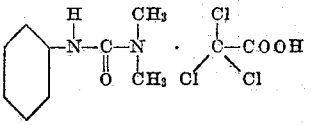

was prepared in xylene. A few crystals of trichloroacetic acid were added, followed by stirring to effect solution. Then, an emulsifying agent was added (2.5% by weight of the solution). Addition of 2 ml. of this solution to 100 ml. hard water, followed by brief agitation, gave an excellent emulsion.

Solutions comprise diamido-halo-acido compounds plus solvent or solvent mixtures. The practical range of diamido-halo-acido compounds in solution is about 5 to 25%. Examples of solvents are benzene, toluene, ethyl benzene, xylene and oils containing a high percentage of aromatic hydrocarbons sold commercially under the trade names of "HiSolv 473," and "Velsicol AR–50G." Solutions of the diamido-halo-acido compounds in aromatic solvents can be diluted further to some extent with inexpensive hydrocarbon oil such as fuel oil, diesel oil, kerosene, or naphtha. In the presence of excess halogenated acids the solutions may be diluted to any desired degree with these cheap solvents with only little or no separation of insoluble material.

One of the important uses of a herbicide is to selectively kill weeds without injury to the desired crops. Diamido-halo-acido compounds, when applied in small quantities, about ½ to between 1 and 2 lbs. per acre, will destroy or retard growth of weeds without material injury to the crops. To obtain the best results with diamido-halo-acido compounds as a selective weed killer, we have found it desirable to employ the pre-emergence treatment, i. e. the application of diamido-halo-acido compounds after planting seeds of the crop but before emergence of the crop. Post-emergence treatment requires the use of greater amounts of diamido-halo-acido compounds and, unless the crop is unusually resistant to herbicide, results in greater damage to the crop. As previously mentioned, in view of the sensitivity of certain crops to variations in dosages of herbicide, it is important that the herbicidal formulation be a true solution containing small amounts of toxicant of the order of 1 to 10% and that the solvent be relatively inexpensive and readily available to the farmer. The diamido-halo-acido compounds are soluble in low cost aromatic oils and a concentrate of diamido-halo-acido compounds in solution with excess acid in an aromatic oil may be prepared and shipped to the farmer who in turn may conveniently blend this concentrate with readily available and inexpensive fuel oil, diesel oil or kerosene to produce a dilute solution of the desired concentration suitable for pre-emergence treatment. In contrast such dilute solutions cannot be prepared when employing such herbicides as chlorophenyldimethylurea and phenyldimethylurea because of their insolubility in such solvents. Thus the importance of the solubility characteristics of the diamido-halo-acido compounds will be evident.

For soil sterilization wherein larger quantities of diamido-halo-acido compounds are employed and where selectivity is not an essential element, dust, wettable powder and emulsifiable concentrate formulations may be emloyed although even in these instances true solutions are preferred because of greater convenience and better control in the application of the herbicide. Quantities of diamido-halo-acido compounds of the order of 20 lbs. per acre of ground have been found to effect complete eradication of weeds. Normally, soil sterilization is effected by treating with diamido-halo-acido compounds once a year and with decreasing amounts of diamido-halo-acido compounds needed in the second and subsequent years to maintain the soil sterile. Complete eradication of weeds is desired on railroad tracks, airports, parking lots, rights-of-way, and the like. A liquid formulation especially well suited to soil sterilization contains excess trichloroacetic acid, and is of the following composition (in pounds per gallon): 2 pounds

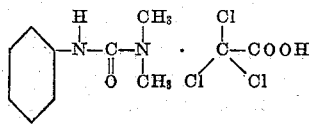

3 pounds trichloroacetic acid, and 4.6 pounds "HiSolv 473" aromatic hydrocarbon oil.

Diamido-halo-acido compounds have also been found useful in controlling aquatic weeds. Small quantities of diamido-halo-acido compounds are effective in controlling aquatic weeds without being toxic to fish. Where the preservation of fish is not a problem such as in ditches, as well as along ditch banks, larger quantities of diamido-halo-acido compounds may be employed.

The diamido-halo-acido compounds are quite stable in pure solid form; however, there is some tendency for certain of the diamido-halo-acido compounds to dissociate or decompose in solution. This dissociation or decomposition, we have found, can be avoided by the addition of an excess of the halogenated aliphatic organic acid. For example, the addition to a solution of the compound

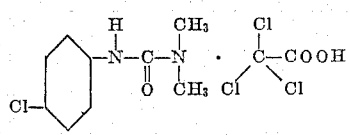

in xylene of about 5% trichloroacetic acid by weight of the solute is adequate to inhibit dissociation. Xylene solutions containing compound

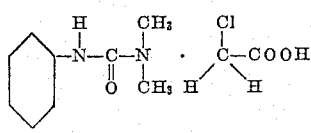

can be inhibited by the addition of about 10–15% of mono-chloroacetic acid by weight of the solute. The addition of excess acid is in some instances an added advantage for other reasons particularly when employing the formulation as a soil sterilant.

A further advantage of the addition of excess acid over that required for formation of the new compounds is that decomposition due to possible overheating is avoided. Although the new compounds are stable at room temperature in solid form, and for a considerable period of time in solution (e. g. several weeks) at moderate room temperature, e. g. about 20 to 30° C., chemical decomposition may occur in solution over a prolonged period of time, especially if the ambient temperature substantially exceeds 30° C.

Trichloroacetic acid is a herbicide which is extremely effective against grassy weeds but relatively ineffective against broadleaf weeds. However, trichloroacetic acid is generally not acceptable for agricultural purposes because, with a few exceptions, it is destructive of crops when applied at dosages effective for weed killing. Consequently, the use of trichloroacetic acid is generally limited to soil sterilization. Much larger dosages of trichloroacetic acid as compared to the diamino-halo-acido compounds are required for soil sterilization—usually 5 to 10 times as much. It is noteworthy that the diamido-halo-acido compounds produced by employing trichloroacetic acid as a reactant do not exhibit the characteristic herbicidal behavior of trichloroacetic acid, i. e. the diamido-halo-acido compounds are selective in their treatment and can be effectively applied as a pre-emergent, will kill both grassy and broadleaf weeds, require appreciably smaller dosages of toxicant, and have greater residual effect. However, trichloroacetic acid does have the property of effecting more rapid kill of weeds than the diamido-halo-acido compounds and therefore it may be desirable for soil sterilization to fortify the diamido-halo-acido compounds by the addition of trichloroacetic acid to give a quick kill, not characteristic of diamido-halo-acido compounds alone. Such a combination would be well suited for treatment of railroad rights-of-way, parking lots, etc. It would also be suitable for brush control and pasture renovation. At low dosages of toxicants, an oil solution containing trichloroacetic acid as an inhibitor can be employed for pre- and post-emergence treatment of crops which are not too sensitive to trichloroacetic acid. If it is desired to employ formulations containing both diamido-halo-acido compounds and halogenated aliphatic acids, and further if such formulations are to be applied for treatment of crops sensitive to trichloroacetic acid, then the halogenated acid should preferably be monochloroacetic acid or dichloroacetic acid which are relatively non-destructive to crops compared to trichloroacetic acid.

The diamido-halo-acido compounds may also be applied in aqueous emulsion provided the water phase contains sufficient of the halogenated aliphatic acid to prevent decomposition of the complex, and provided a water immiscible solvent is used to dissolve the complex. An emulsifier may be used, if desired, although fair suspension can be obtained without an emulsifier if sufficient agitation is provided. The diamido-halo-acido compounds which are solid, can also be used as dusts, since—somewhat surprisingly—they do not absorb moisture from the air as does trichloroacetic acid alone.

In Table I below are presented test data using different herbicides in pre-emergence tests in the greenhouse.

Table I.—Results of pre-emergence tests in the greenhouse with a diamido-halo-acido compound; trichloroacetic acid, and xylene

| Compound [2] | Pounds per Acre | | | | | |
| --- | --- | --- | --- | --- | --- | --- |
| | 2 | | 4 | | 6 | |
| | W [3] | C [3] | W | C | W | C |
| (a) | [4] 7.6 | 2.0 | 8.3 | 4.6 | 9.0 | 5.0 |
| (b) | 7.6 | 4.6 | 9.3 | 5.3 | 9.3 | 5.6 |
| (c) | 0.6 | 0.6 | 3.6 | 3.6 | | |
| (d) | 0 | 0 | 0 | 0 | 0 | 0 |

[1] Expressed as actual poundage of 100% toxicant used in each case.
[2] (a)

(a) 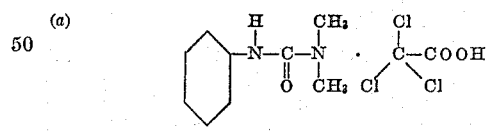

(b) 1-(phenyl)-3,3-dimethylurea (as 80% wettable powder).
(c) Trichloroacetic acid.
(d) Xylene.
[3] W=weeds; C=crops—corn, wheat, soya bean, cotton.
[4] United States Department of Agriculture rating system used: 0, none; 1–3, slight; 4–6, moderate; 7–9, severe; 10, all killed.

It will be noted that at the 2 pound dosage (which is about the maximum which can be used ordinarily on crop land), the new compound is equally effective with the urea, but much less injurious to crops. The higher dosages, which would be used on resistant crops such as sugar cane, also show a differential in favor of the new compound on a pound-for-pound basis in comparison with the urea. At all dosages, use of the new compound is more economical, since it is cheaper per pound.

In table II below are presented greenhouse test data with one of the new compounds on grasses. It will be noted that the new compound is about twice as effective on grasses as trichloroacetic acid alone at twice the dosage.

Table II.—Pre-emergence tests on weeds in the greenhouse with diamido-halo-acido compound (a) and trichloroacetic acid

| Pounds Per Acre | Diamido-halo-acido compound (a)[1] 8 | Trichloro-acetic Acid [1] 16 | Xylene, 40 gallons |
|---|---|---|---|
| Ryegrass: | | | |
| Injury rating [2] | 10 | 6 | 0 |
| Percent plants killed | 100 | 63 | 0 |
| Crabgrass: | | | |
| Injury rating [2] | 10 | 6 | 0 |
| Percent plants killed | 100 | 63 | 0 |
| Rape: | | | |
| Injury rating [2] | 10 | 5 | 0 |
| Percent plants killed | 100 | 50 | 0 |

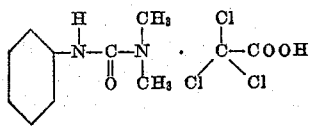

[1] Applied in 40 gallons xylene per acre.
[2] Injury rating as in Table I.

In Table III below are shown post-emergence field test data with two of the new compounds and 1-(phenyl)-3,3-dimethylurea and xylene. It will be noted that the new compounds are much more effective than 1-(phenyl)-3,3-dimethylurea alone especially on grasses. It is well known that the acids alone at these dosages are relatively ineffective.

Table III.—Post-emergence tests in the field with diamido-halo-acido compounds; 1-(phenyl)-3,3-dimethylurea, and xylene

| Compound | Diluent | Pounds[1] Per Acre | Percent Weeds Killed (after days (given)) | | | | | |
|---|---|---|---|---|---|---|---|---|
| | | | Broadleaf | | | Grasses | | |
| | | | 14 | 28 | 78 | 14 | 28 | 78 |
| (a) | xylene | 4 | 100 | 90 | 80 | 100 | 90 | 80 |
| (b) | do | 4 | 100 | 90 | 90 | 100 | 90 | 80 |
| (c) | water | 4 | 100 | 90 | 60 | 20 | 0 | 0 |
| xylene | | 40 gallons | 80 | 70 | 0 | 70 | 0 | 0 |

[1] Actual pounds applied in 40 gallons diluent per acre, except for the compounds where the poundage applies to the urea portion only.

(a) 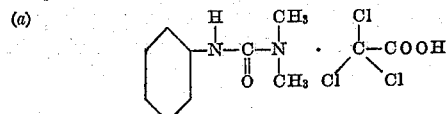

(b) 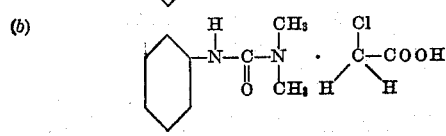

(c) 1-(phenyl)-3,3-dimethylurea (80% wettable).

Although certain preferred embodiments of the invention have been disclosed for purpose of illustration, it will be evident that various changes and modifications may be made therein without departing from the scope and spirit of the invention.

We claim:

1. A compound suitable for use as a herbicide having the general formula

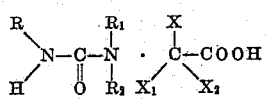

wherein R represents a cyclic group selected from the class consisting of the phenyl, alkyl-phenyl, aralkyl-phenyl, diphenyl, naphthyl, cyclohexyl and alkyl-cyclohexyl radicals, and their halogen substitution products; $R_1$ represents a group selected from the class consisting of hydrogen and an aliphatic hydrocarbon radical having no more than six carbon atoms; $R_2$ represents an aliphatic hydrocarbon radical having no more than six carbon atoms; X represents a halogen; and $X_1$ and $X_2$ represent a member of the group selected from the class consisting of hydrogen and halogen.

2. A compound suitable for use as a herbicide having the general formula

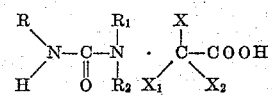

wherein R represents a phenyl radical; $R_1$ represents an aliphatic hydrocarbon radical having no more than three carbon atoms; $R_2$ represents an aliphatic hydrocarbon radical having no more than three carbon atoms; and X, $X_1$ and $X_2$ represent chlorine.

3. A compound suitable for use as a herbicide having the general formula

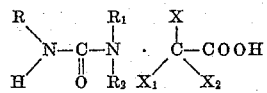

wherein R represents a monochlorophenyl radical; $R_1$ represents an aliphatic hydrocarbon radical having no more than three carbon atoms; $R_2$ represents an aliphatic hydrocarbon radical having no more than three carbon atoms; and X, $X_1$ and $X_2$ represent chlorine.

4. A compound suitable for use as a herbicide having the general formula

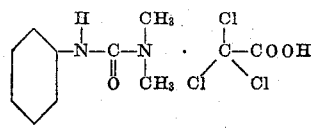

5. A compound suitable for use as a herbicide having the general formula

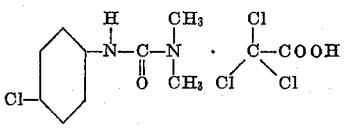

6. A compound suitable for use as a herbicide having the general formula

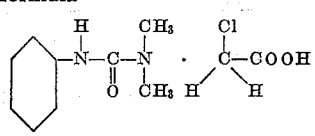

7. A compound suitable for use as a herbicide having the general formula

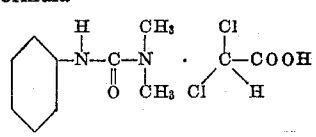

8. A compound suitable for use as a herbicide having the general formula

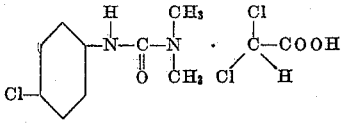

9. A method for controlling the growth of weeds which comprises applying to an area on which weed growth is to be retarded, in an amount sufficient to exert a herbicidal action, a compound having the general formula

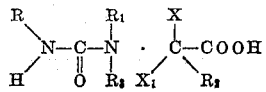

wherein R represents a cyclic group selected from the class consisting of the phenyl, alkyl-phenyl, aralkyl-phenyl, diphenyl, naphthyl, cyclohexyl and alkyl-cyclohexyl radicals, and their halogen substitution products; R₁ represents a group selected from the class consisting of hydrogen and an aliphatic hydrocarbon radical having no more than six carbon atoms; R₂ represents an aliphatic hydrocarbon radical having no more than six carbon atoms; X represents a halogen; and X₁ and X₂ represent a member of the group selected from the class consisting of hydrogen and halogen.

10. A method for controlling the growth of weeds which comprises applying to an area on which weed growth is to be retarded, in an amount sufficient to exert a herbicidal action, a compound having the general formula

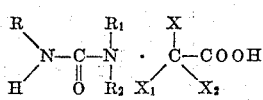

wherein R represents a phenyl radical, R₁ represents an aliphatic hydrocarbon radical having no more than three carbon atoms, R₂ represents an aliphatic hydrocarbon radical having no more than three carbon atoms, and X, X₁ and X₂ represent chlorine.

11. A method for controlling the growth of weeds which comprises applying to an area on which weed growth is to be retarded, in an amount sufficient to exert a herbicidal action, a compound having the general formula

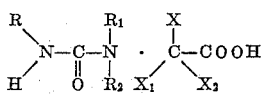

wherein R represents a monochlorophenyl radical; R₁ represents an aliphatic hydrocarbon radical having no more than three carbon atoms; R₂ represents an aliphatic hydrocarbon radical having no more than three carbon atoms; and X, X₁ and X₂ represent chlorine.

12. A method for controlling the growth of weeds which comprises applying to an area on which weed growth is to be retarded, in an amount sufficient to exert a herbicidal action, a compound having the general formula

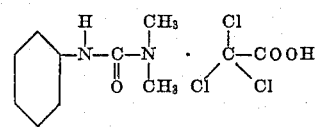

13. A method for controlling the growth of weeds which comprises applying to an area on which weed growth is to be retarded, in an amount sufficient to exert a herbicidal action, a compound having the general formula

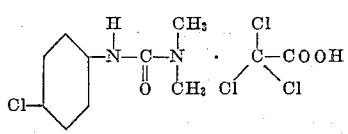

14. A method for controlling the growth of weeds which comprises applying to an area on which weed growth is to be retarded, in an amount sufficient to exert a herbicidal action, a compound having the general formula

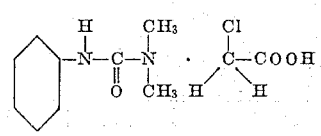

15. A method for controlling the growth of weeds which comprises applying to an area on which weeds growth in to be retarded, in an amount sufficient to exert a herbicidal action, a compound having the general formula

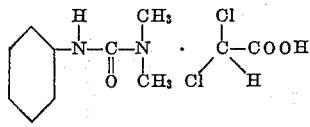

16. A method for controlling the growth of weeds which comprises applying to an area on which weed growth is to be retarded, in an amount sufficient to exert a herbicidal action, a compound having the general formula

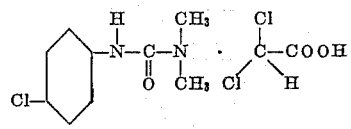

17. A solution for use in the destruction and prevention of weeds comprising a liquid aromatic hydrocarbon solvent having dissolved therein a compound having the formula

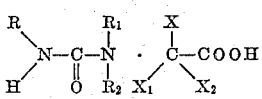

wherein R represents a cyclic group selected from the class consisting of the phenyl, alkyl-phenyl, aralkyl-phenyl, diphenyl, naphthyl, cyclohexyl and alkyl-cyclohexyl radicals, and their halogen substitution products; R₁ represents a group selected from the class consisting of hydrogen and an aliphatic hydrocarbon radical having no more than six carbon atoms; R₂ represents an aliphatic hydrocarbon radical having no more than six carbon atoms; X represents a halogen; and X₁ and X₂ represent a member of the group selected from the class consisting of hydrogen and halogen.

18. A solution for use in the destruction and prevention of weeds comprising a liquid aromatic hydrocarbon solvent having dissolved therein a compound having the formula

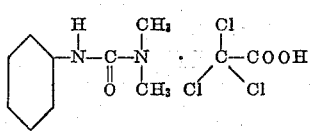

19. A solution for use in the destruction and prevention of weeds comprising a liquid aromatic hydrocarbon solvent having dissolved therein a compound having the formula

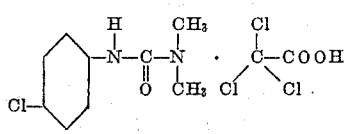

20. A solution for use in the destruction and prevention of weeds comprising a liquid aromatic hydrocarbon solvent, a liquid petroleum hydrocarbon fraction and a compound having the formula

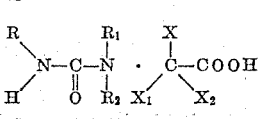

wherein R represents a cyclic group selected from the class consisting of the phenyl, alkyl-phenyl, aralkyl-phenyl, diphenyl, naphthyl, cyclohexyl and alkyl-cyclohexyl radicals, and their halogen substitution products; R₁ represents a group selected from the class consisting of hydrogen and an aliphatic hydrocarbon radical having no more than six carbon atoms; R₂ represents an aliphatic hydrocarbon radical having no more than six carbon atoms; X represents a halogen; and X₁ and X₂ represent a member of the group selected from the class consisting of hydrogen and halogen.

21. A solution for use in the destruction and prevention of weeds comprising a liquid aromatic hydrocarbon solvent, a liquid petroleum hydrocarbon fraction and a compound having the formula

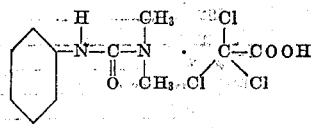

22. A solution for use in the destruction and prevention of weeds comprising a liquid aromatic hydrocarbon solvent, a liquid petroleum hydrocarbon fraction and a compound having the formula

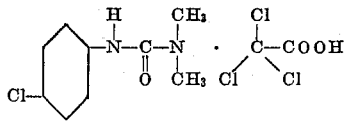

23. A solution containing as a solute a compound having the formula

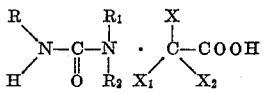

wherein R represents a cyclic aryl group selected from the class consisting of the phenyl, alkyl-phenyl, aralkyl-phenyl, diphenyl, naphthyl, cyclohexyl and alkyl-cyclohexyl radicals, and their halogen substitution products; $R_1$ represents a group selected from the class consisting of hydrogen and an aliphatic hydrocarbon radical having no more than six carbon atoms; $R_2$ represents an aliphatic hydrocarbon radical having no more than six carbon atoms; X represents a halogen, and $X_1$ and $X_2$ represent a member of the group selected from the class consisting of hydrogen and halogen; and a compound having the formula

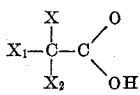

wherein X represents a halogen, and $X_1$ and $X_2$ represent a member of the group selected from the class consisting of hydrogen and halogen in an amount sufficient to retard decomposition of the solute.

24. A solution comprising a liquid organic solvent and containing as a solute a compound having the formula

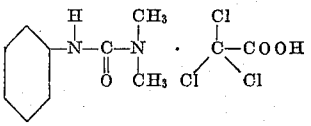

and containing trichloroacetic acid in an amount sufficient to retard decomposition of said solute.

25. A solution comprising a liquid organic solvent and containing as a solute a compound having the formula

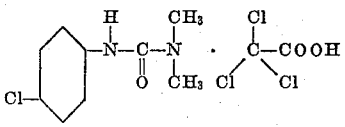

and containing trichloroacetic acid in an amount sufficient to retard decomposition of said solute.

26. A method for controlling the growth of weeds which comprises applying to an area on which weed growth is to be retarded, in an amount sufficient to exert a herbicidal action, a solution comprising a liquid aromatic hydrocarbon solvent having dissolved therein a compound having the formula

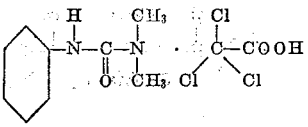

27. A method for controlling the growth of weeds which comprises applying to an area on which weed growth is to be retarded, in an amount sufficient to exert a herbicidal action, a solution comprising a liquid aromatic hydrocarbon solvent having dissolved therein a compound having the formula

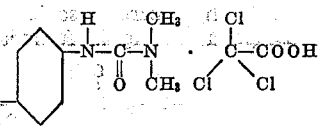

28. A method for controlling the growth of weeds which comprises applying to an area on which weed growth is to be retarded, in an amount sufficient to exert a herbicidal action, a mixture comprising a solution of liquid aromatic hydrocarbon solvent having dissolved therein a compound having the formula

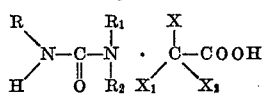

wherein R represents a cyclic aryl group selected from the class consisting of the phenyl, alkyl-phenyl, aralkyl-phenyl, diphenyl, naphthyl, cyclohexyl and alkyl-cyclohexyl radicals, and their halogen substitution products; $R_1$ represents a group selected from the class consisting of hydrogen and an aliphatic hydrocarbon radical having no more than six carbon atoms; $R_2$ represents an aliphatic hydrocarbon radical having no more than six carbon atoms; X represents a halogen; and $X_1$ and $X_2$ represent a member of the group selected from the class consisting of hydrogen and halogen; and a liquid petroleum hydrocarbon fraction.

29. A method for controlling the growth of weeds which comprises applying to an area on which weed growth is to be retarded, in an amount sufficient to exert a herbicidal action, a mixture comprising a solution of liquid aromatic hydrocarbon solvent having dissolved therein a compound having the formula

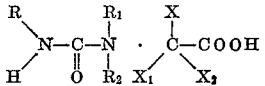

wherein R represents a cyclic group selected from the class consisting of the phenyl, alkyl-phenyl, aralkyl-phenyl, diphenyl, naphthyl, cyclohexyl and alkyl-cyclohexyl radicals, and their halogen substitution products; $R_1$ represents a group selected from the class consisting of hydrogen and an aliphatic hydrocarbon radical having no more than six carbon atoms; $R_2$ represents an aliphatic hydrocarbon radical having no more than six carbon atoms; X represents a halogen; and $X_1$ and $X_2$ represent a member of the group selected from the class consisting of hydrogen and halogen; and a compound having the formula

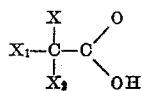

wherein X represents a halogen; and $X_1$ and $X_2$ represent a member of the group selected from the class consisting of hydrogen and halogen in an amount sufficient to retard decomposition of the solute.

30. A method for controlling the growth of weeds which comprises applying to an area on which weed growth is to be retarded, in an amount sufficient to exert a herbicidal action, a mixture comprising a solution of liquid aromatic hydrocarbon solvent having dissolved therein a compound having the formula

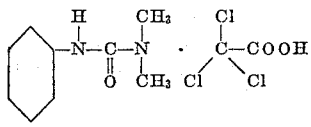

and containing trichloroacetic acid in an amount sufficient to retard decomposition of said solute.

31. A method for controlling the growth of weeds which comprises applying to an area on which weed growth is to be retarded, in an amount sufficient to exert a herbicidal action, a mixture comprising a solution of liquid aromatic hydrocarbon solvent having dissolved therein a compound having the formula

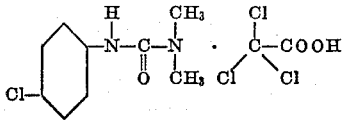

and containing trichloroacetic acid in an amount sufficient to retard decomposition of said solute.

References Cited in the file of this patent
UNITED STATES PATENTS

| | | |
|---|---|---|
| 2,237,240 | Sponsel | Apr. 1, 1941 |
| 2,393,086 | Bousquet | Jan. 15, 1946 |
| 2,569,984 | Fetterly | Oct. 2, 1951 |
| 2,596,344 | Newey et al. | May 13, 1952 |
| 2,598,953 | Weitkamp et al. | June 3, 1952 |
| 2,622,974 | Swezey | Dec. 23, 1952 |
| 2,642,423 | Gorin | June 16, 1953 |
| 2,655,445 | Todd | Oct. 13, 1953 |
| 2,655,447 | Todd | Oct. 13, 1953 |